Figure 1A:
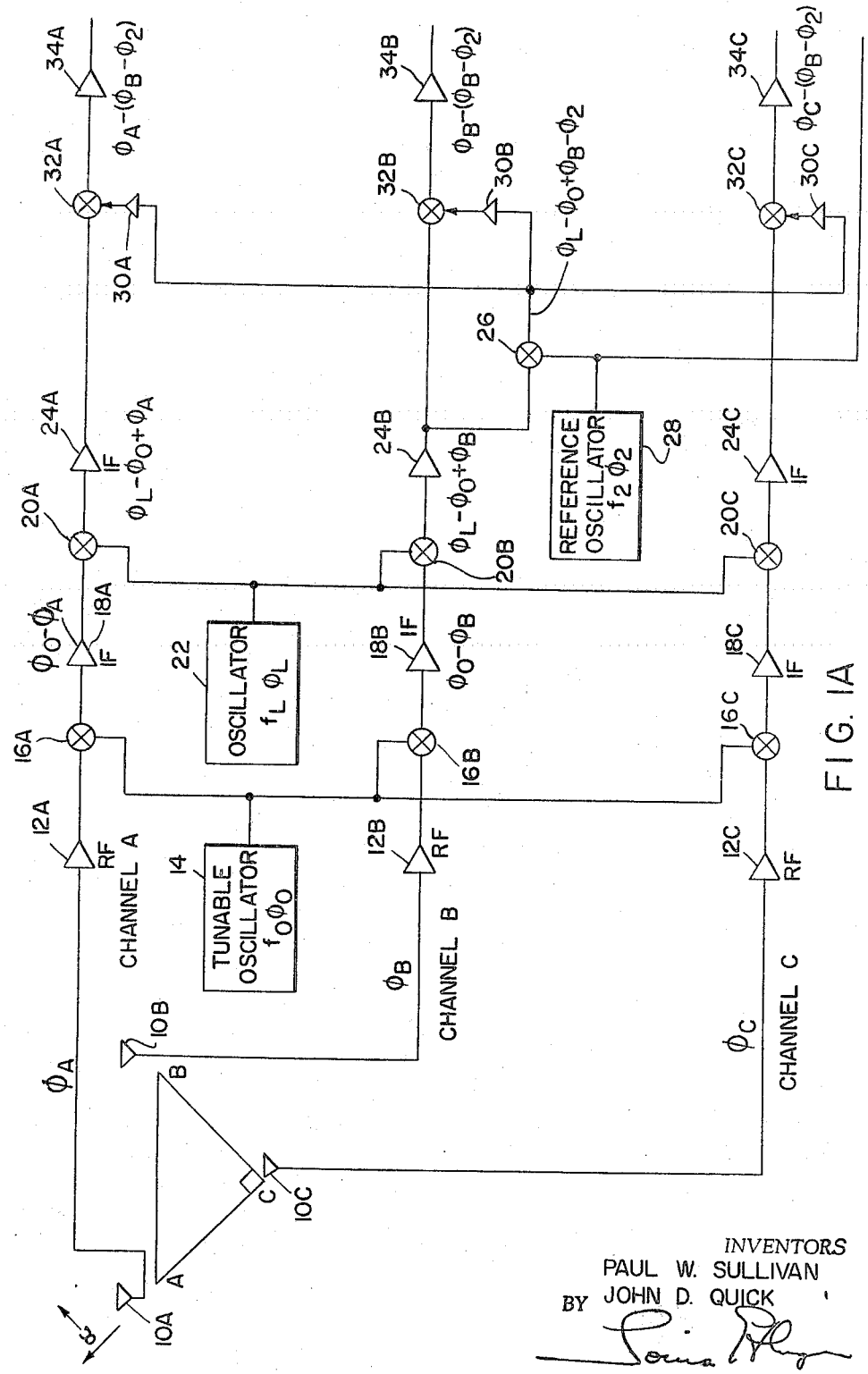

INVENTORS
PAUL W. SULLIVAN
JOHN D. QUICK
BY
ATTORNEY

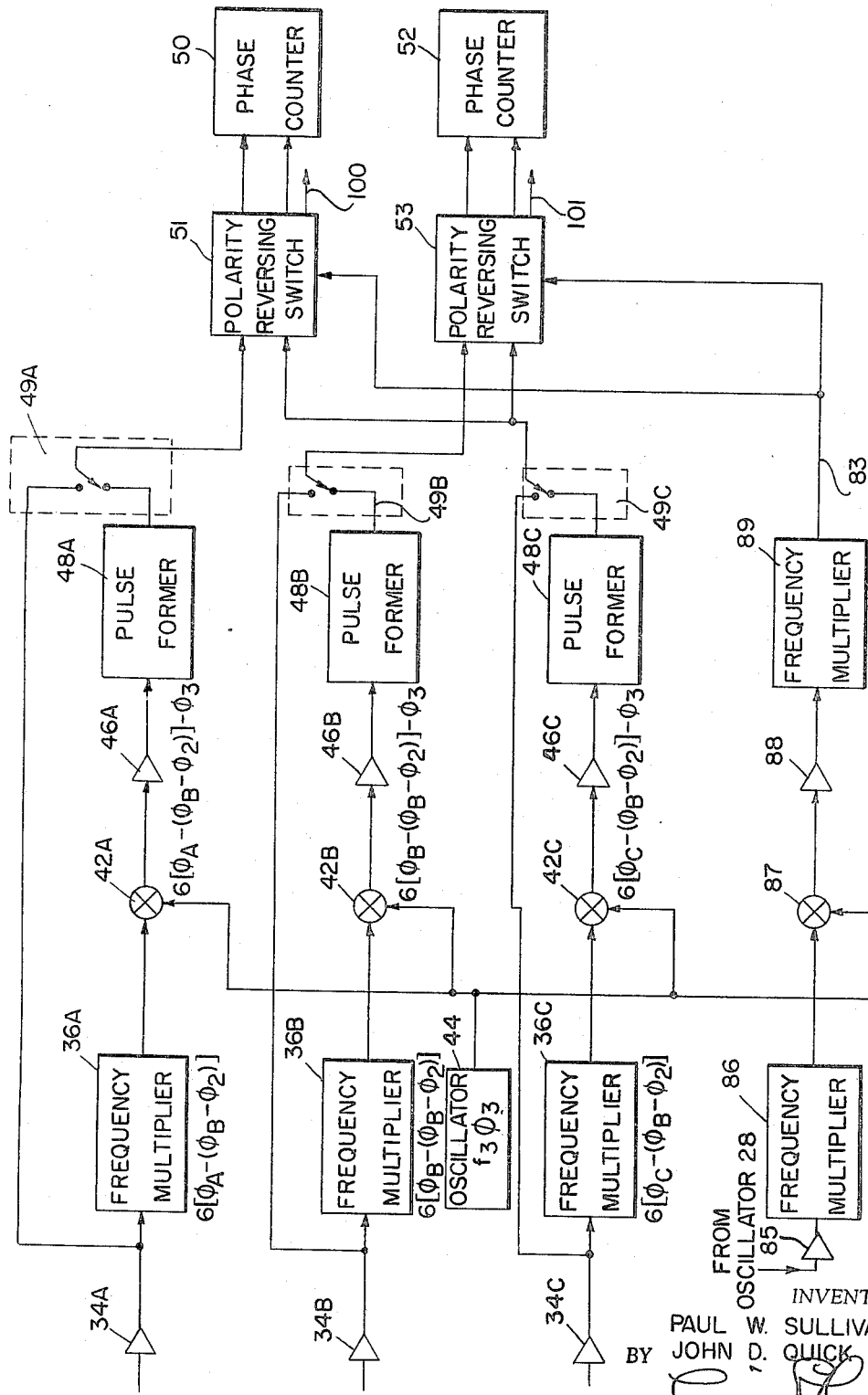

INVENTORS
PAUL W. SULLIVAN
JOHN D. QUICK
ATTORNEY

United States Patent Office 3,325,813
Patented June 13, 1967

3,325,813
PHASE MEASURING DIRECTION FINDER
John D. Quick, Nashua, and Paul W. Sullivan, Hudson, N.H., assignors to Sanders Associates, Inc., Nashua, N. H., a corporation of Delaware
Filed Jan. 23, 1964, Ser. No. 339,748
12 Claims. (Cl. 343—113)

The present invention relates to a system for indicating the difference in phase between two or more signals. More particularly, it relates to a system for determining with considerable speed and accuracy the difference in phase between the responses of the various closely spaced elements of an antenna array when the array receives electromagnetic radiation. This phase difference, in turn, indicates the angle of incidence of the incident radiation.

The invention is based upon the principle that the time of arrival of electromagnetic radiation at a plurality of spaced antennas differs in accordance with the spacing of the antennas and the direction of arrival, i.e., the angle of incidence. Because of this time difference, the phases of the signal outputs on the various antennas differ correspondingly. If the antenna spacing is known, the phase differences between the signal outputs of the various antennas constitute an indication of the direction of arrival of the incoming electromagnetic radiation.

Direction finding systems which take advantage of this principle of operation have been known for some time. They find particular application in tracking stations which follow the progress of flying objects, as for example, aircraft and artificial satellites. The source of the radiation may be carried by the flying object or, alternatively, the source may be a radar system which bounces signals off the object.

Another important application is in the field of navigation where it is desired to determine, in a vehicle such as a ship or aircraft, the direction of a signal source of known location. In this application, the direction finding system is carried by the vehicle.

It will be appreciated that as the antenna spacing is increased, the phase differential of the signals from the various antenna elements likewise increase. This characteristic has been used to achieve a significant phase differential and thereby increase the accuracy of the system. Specifically, the spacing between the antennas, normally referred to as the baseline spacing, has generally been made at least as great as $\lambda/2$, where $\lambda$ is the wavelength of the incident signals. However, antenna spacing becomes an acute problem where it is desired to mount a direction finding system on vehicles such as aircraft. It is difficult enough to find sufficiently spaced antenna mounting points on a large aircraft and, in the case of small aircraft, extensive antenna spacing is impossible.

Another deficiency generally found in many prior systems of this type is that they can effectively process signals over only a small range of frequencies. This is because a system in which the antenna spacing is small enough to avoid ambiguities at high frequencies (short wavelengths) results in an unduly small phase difference between antenna signals at low frequencies (long wavelengths).

A still further limitation of prior systems resides in the fact that they are relatively slow in operation, particularly where analog techniques are used in determining the relative phase angle. A a result, the system may lag rapidly changing phase angles. For example, an analog system may utilize a mechanical nulling technique wherein the antenna array is oriented with respect to the source of the incident signals to achieve zero relative phase differential. The orientation of the array then indicates the angle of incidence. Systems of this type are necessarily bulky and inaccurate where high speed of operation is required.

In addition, prior direction finding systems have been generally limited to determining the azimuth of the signal source and are not readily adaptable to determining both the azimuth and elevation angle thereof. This is not an important consideration where the vehicle is traveling on the surface of the earth. However, in the case of aircraft, both data are necessary in order to establish the direction of the signal source with respect to the vehicle.

It is therefore an object of the present invention to provide a system for indicating with considerable accuracy the phase difference between two signals.

It is a further object to provide an improved direction finding system wherein the spacing between antennas, i.e., the baseline spacing is reduced to a minimum.

A more specific object is to provide a direction finding system which is capable of indicating the difference in phase between a signal received by at least two closely spaced antenna elements.

A still further object is to provide a broad-band direction finding system particularly adapted for use on vehicles and capable of rapidly developing phase information relative to the azimuth and the elevation of a remotely located signal source.

Other objects of the invention will in part be obvious and will in part appear hereinafter.

The invention accordingly comprises the features of construction, combination of elements and arrangement of parts which will be exemplified in the construction hereinafter set forth, and the scope of the invention will be indicated in the claims.

Figure 2:
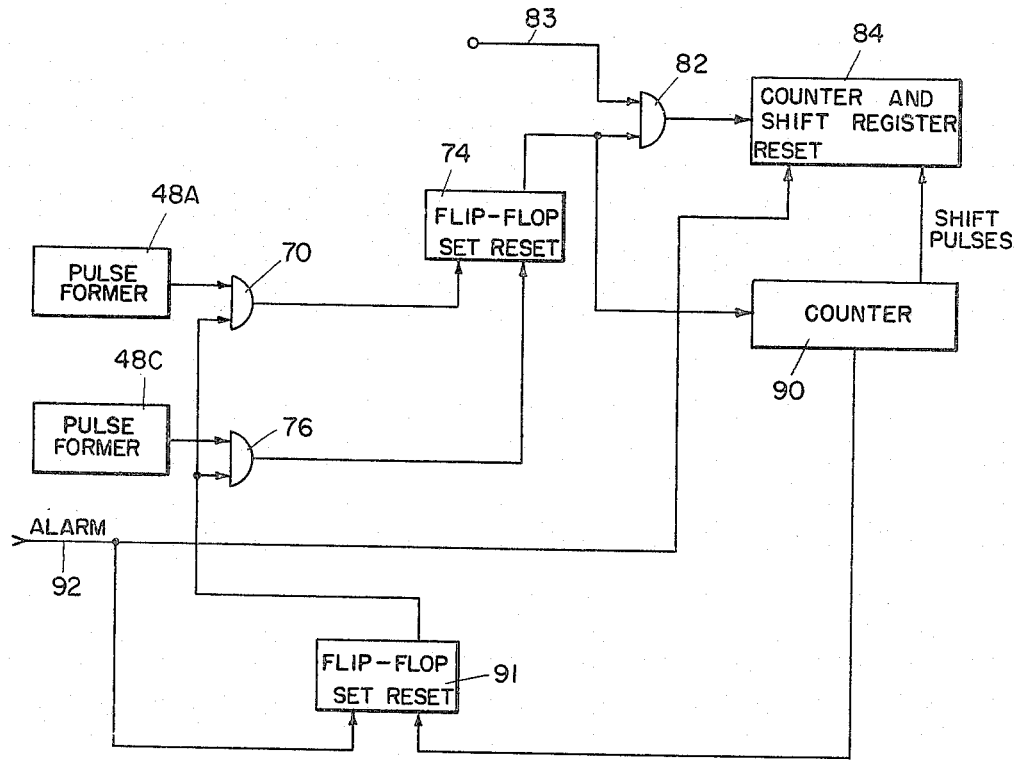

For a fuller understanding of the nature and objects of the invention, reference should be had to the following detailed description, taken in connection with the accompanying drawings, in which:

FIG. 1 (A and B) is a block diagram of one embodiment of the present invention, and FIG. 2 is a detailed diagram of one of the phase counters shown in FIG. 1.

The invention will be described with reference to a plurality of antennas 10A, 10B and 10C, as shown in FIG. 1, having a uniform baseline spacing between adjacent antennas which can be substantially less than one-half wavelength. Two pairs of antennas are required to obtain both azimuth and elevation angle information. However, this information may be obtained by using only three antennas where one, 10C, for example, is common to both pairs. Ideally, this can be accomplished by positioning the antennas at the apexes of a triangle. Assuming, for example, that the system is carried by an airplane, the plane of the triangle is preferably horizontal and symmetrically disposed with respect to the aircraft. This arrangement materially aids in the solution of the phase equations. Other antenna array configurations may be used, however, without serious degradation of the system.

For example, assume the right isosceles triangular antenna configuration of FIG. 1, with the antennas 10A, 10B and 10C, disposed in a horizontal plane viewed from above in the drawing. The azimuth angle $\alpha$ of a transmitter T, measured from the reference line AC, is related to the relative phases at the antennas by $$\tan \alpha = \frac{\phi_B - \phi_C}{\phi_A - \phi_C} \qquad (1)$$

where $\phi_A$, $\phi_B$ and $\phi_C$ are the phases of energy received at the respective antennas 10A, 10B and 10C.

The elevation angle $\epsilon$ between the plane of the antennas and a line drawn to the transmitter T is related to the phaes by $$\cos \epsilon = \frac{\lambda(\phi_A - \phi_C)}{d360 \cos \alpha} \qquad (2)$$

where $\lambda$ is the wavelength of radiation from the transmitter T, and $d$ is the spacing between antennas 10A and 10C.

It will be noted that determination of the angle $\epsilon$ requires knowledge of the transmitted frequency, whereas such information is not required for determination of the azimuth angle $\alpha$.

The signals received by the various antennas are introduced to their respective channels and are uniformly heterodyned to an intermediate difference frequency while retaining the original relative phase information. The IF signals in one of the channels are mixed with a reference oscillator of high frequency stability. The resulting beat frequency signal is then mixed with the IF signals in all three channels. As shown below, this reduces all of the signals in the various channels to the stable frequency of the reference oscillator.

The signals are then uniformly multiplied in both frequency and phase, thus expanding the phase relations between the signals in the respective channels. The signals are subsequently reduced in frequency by heterodyne action, but the expanded phase relationship is retained during this operation. Thus, expansion of the phase differential for increased accuracy is accomplished without resort to large inter-antenna spacing.

In order to determine this magnified phase relationship between the various signals, digital counters are employed. Each of the counters counts clock pulses occurring over the time interval between the occurrence of corresponding points in the wave forms of the signals in two of the channels, as for example, their positive-going zero crossings. Since the frequency of the signals has been accurately fixed by the stable local oscillator, the relative phase of the two signals is precisely given by the count accumulated by the counter in this interval. One counter registers the phase difference between signals in the channels connected to the antennas 10A and 10C and thus provides an indication of the elevational angle $\epsilon$. A second counter processes the signals in the channels connected to the antennas 10B and 10C, and this, together with the phase reading from the first channel, results in the desired azimuth information.

More specifically, as seen in FIG. 1, antennas 10A, 10B and 10C, physically arranged in the manner described above, are connected in signal channels A, B and C, respectively. The antennas are untuned, but always terminated, so that the interaction between antennas is constant and may be included in the site calibration. Since antenna 10C is the common antenna, the spacing between antennas 10B and 10C is equal to the spacing between antennas 10A and 10C. In the detailed description to follow, where applicable, the reference numerals for the various elements will be given the suffix A, B or C, depending upon the signal channel in which they are connected.

Accordingly, the signals appearing in channels A, B and C from the antennas are amplified in radio frequency amplifiers 12A, 12B and 12C. The outputs from these amplifiers are mixed with the output of a tunable local oscillator 14 in mixers 16A, 16B and 16C. Oscillator 14 is either manually or automatically tuned in frequency in accordance with the frequency of the incident signals in order that the difference frequency signal output from mixers 16A, 16B and 16C may be maintained within a narrow frequency band. This provision renders the system broadband, whereas the components, except for the amplifiers 12 and mixers 16, need not be designed for broadband operation. The resulting difference frequency signals are amplified in intermediate frequency amplifiers 18A, 18B and 18C and then heterodyned in mixers 20A, 20B and 20C with the output of a second oscillator 22. The resulting difference frequency signals in the respective channels are again amplified in amplifiers 24A, 24B and 24C to provide signals at some intermediate frequency which still contain their original phases plus uniform phase shifts resulting from the relative phases of oscillators 14 and 22. That is, except as noted below, the phase relationships between the incoming signals in the respective channels are preserved during this heterodyning process. Limiting or automatic gain control may be employed at this point to eliminate amplitude variation of the signals.

The output of any channel IF amplifier such as 24B is fed to a mixer 26. A stable reference oscillator 28 provides the second input to this mixer. The difference beat frequency output from mixer 26 is amplified by amplifier 30A, 30B and 30C, and fed to mixers 32A, 32B and 32C, to be heterodyned with the outputs of the amplifiers 24, i.e., the difference beat frequency is again selected. As a result of this cancellation technique, the signals in the various channels at the outputs of mixers 32A, 32B and 32C are at the frequency of the reference oscillator. Not only will these signals have the frequency stability of the reference oscillator 28, but in addition, any frequency drift resulting from local oscillators 14 and 22 will be cancelled out.

The manner in which the frequency of the signals in the various channels is reduced to the frequency of the reference oscillator 28 will be understood by observing the frequencies of the output signals from the various mixers. Assume that each mixer, or the amplifier at the output terminals thereof, includes a suitable filter for selecting the sum or difference frequency of the mixer, as the case may be.

Then, if the frequency of the oscillator 14 is greater than the input signal frequency $f_1$, the first intermidate frequency in each channel is $f_o - f_1$, assuming frequency subtraction in the mixers 16. Similarly, the injection of the frequency of the oscillator 22 results in a second intermediate frequency.

$$f_L - f_o + f_1$$

at the outputs of the mixers 20.

With frequency subtraction at the mixer 26, and a frequency $f_2$ from the oscillator 28 which is lower than the second intermediate frequency, the output frequency of the amplifiers 30A, 30B and 30C is $$f_L - f_o + f_1 - f_2$$

Mixing of these amplifier outputs with the outputs of the amplifiers 24 in mixers 32A, 32B and 32C provides a resulting frequency.

$$f_L - f_o + f_1 - (f_L - f_o + f_1 - f_2) = f_2$$

This frequency is passed by amplifiers 34A, 34B and 34C.

It should also be noted at this point that, although the invention has thus far been described in terms of accepting only the difference frequencies from the outputs of the various mixers, various combinations of mixers supplying sum and difference frequency signals might be used, provided that at the conclusion of the cross-heterodyning, the frequency of the signals is that of the stable reference oscillator. Use of difference signals throughout, however, is considered more advisable because of the relative difficulty and expense in handling the high frequencies resulting from frequency summation if the signal frequency $f_1$ is high.

The phases of the various signal sources in FIG. 1 are denoted by the letter $\phi$, with subscripts denoting the respective sources. Thus, the subscripts A, B and C refer to the antennas A, B and C, while $o$, L and 2 denote the oscillator 14, 22 and 30, respectively. Accordingly, the input phases $\phi_A$, and $\phi_o$ of the mixer 16A result in a phase, $(\phi_o - \phi_A)$, for the intermediate frequency passed by the amplifier 18A. Frequency subtraction by means of the mixer 20A then provides a second intermediate frequency with a corresponding phase $(\phi_L - \phi_o + \phi_A)$. The phases at the corresponding points in the other channels are $(\phi_L - \phi_o + \phi_B)$ and $(\phi_L - \phi_o + \phi_C)$.

With frequency subtraction by the mixer 26, the resulting phase in the output of this mixer is $$(\phi_L - \phi_0 + \phi_B - \phi_2)$$

From inspection of FIG. 1, it is readily ascertained that the phases at the outputs of amplifiers 34A, 34B and 34C are as follows:

Amplifier $34A = \phi_A - (\phi_B - \phi_2)$
Amplifier $34B = \phi_B - (\phi_B - \phi_2)$
Amplifier $34C = \phi_C - (\phi_B - \phi_2)$ The outputs of amplifiers 34A, 34B and 34C, respectively, are fed to frequency multipliers 36A, 36B and 36C. Illustratively, each multiplier may contain a frequency doubler and a tripler for a total frequency multiplication of 6. Frequency multiplication results in multiplication of phase by the same factor, as indicated by the phase values shown in FIG. 1. Thus, the difference in the phases of two signals undergoing frequency multiplication is magnified by this factor. Accordingly, the multiplication factor should be large in order to make the phase differences measured by the system as large as possible and thereby facilitate such measurements. At the same time the factor should not be so large as to increase the measured phase differences above 360°, or ambiguity of measurement may result.

With a frequency multiplication of 6, this relationship can be ensured by making the spacing between the antennas 10A and 10C (and likewise between the antennas 10B and 10C in the illustrated arrangement) less than the length corresponding to one-sixth of 360° at the highest frequency of operations. For example, these antenna spacing may be $55/360$, so that the maximum phase difference at the outputs of the amplifiers 46 will be 330°.

The multipliers 36 are followed by mixers 42A, 42B and 42C, which also derive an input signal from a stable oscillator 44 having a frequency $f_3$ and a phase $\phi_3$. Frequency subtraction is accomplished and preferably $f_2$ and $f_3$ are close to each other, so that a low difference frequency is passed by amplifiers 46A, 46B and 46C. The enlarged relative phase values are preserved by the frequency subtraction and with the low difference frequency, the time interval corresponding to a given phase increment is greatly increased. Since the system actually measures such intervals, accuracy is enhanced by use of this low frequency, e.g., 1,000 c.p.s.

More specifically, the difference in phase of the outputs of the amplifiers 46A and 46C is $6(\phi_A - \phi_C)$, while the phase difference between the outputs of amplifiers 46A and 46B is $6(\phi_A - \phi_B)$. It is these phase differences which are measured by the measuring circuit about to be described. Moreover, the frequency of these signals is a low, stable frequency derived solely from the stable oscillators 28 and 44. Thus, the signals are free of phase error due to instability of the oscillators 14 and 22, as noted above, particularly the tunable oscillator 14. Moreover, the phases of none of the oscillators are reflected in the above phase differences.

It is noted that fixed phase lags due to transit time through the respective channels may be reflected in the phases of the amplifier 46 outputs, though for convenience they have not been included in the above analysis. If these lags differ among the respective channels, they can easily be accounted for in calibration of the system.

After amplification by the amplifiers 46, the signals in the respective channels are fed to pulse formers 48A, 48B and 48C to provide uniform pulse outputs coincident in time with corresponding points in the cycles of each signal as, for example, at the positive-going zero crossing of each cycle. Illustratively each pulse former may include a wave squaring circuit, which amplifies and clips the sine wave input to convert it into a square wave. The square wave is then passed through a differentiator, with a diode arrangement in the output of a differentiator to pass only pulses having a given polarity.

The signals from the pulse formers are passed through switches 51 and 53 to phase counters 50 and 52. Each counter circuit measures the time interval between corresponding points in the cycles of the signals in the two channels from which it derives its input. These points are the positive axis crossings indicated by the pulses from the pulse formers. The counter circuit 50 receives the output pulses from pulse formers 48A and 48C and counter circuit 52 receives the pulses from pulse formers 48B and 48C.

FIG. 2 discloses in detail the counter circuit 50, the counter circuit 52 being similarly arranged. Assume that the switch 51 (eliminated in this figure) is set so that the output of pulse former 48A is passed through a gate 70 to set a flip-flop 74. The corresponding signal from channel C is applied to the other (reset) input of flip-flop 74 through a gate 76. When this flip-flop is set, it enables a gate 82, which in turn, passes clock pulses on a line 83 to a digital counter-shift register 84.

Returning briefly to FIG. 1, the clock pulses on line 83 are illustratively derived from the oscillator 28 by means of an amplifier 85, a frequency multiplier 86, a mixer 87 deriving another input from the oscillator 44, a further amplifier 88 and a frequency multiplier 89. Thus, the output frequency of the mixer 87, as passed by the amplifier 88, is the same as the frequency of the pulses from the pulse formers 48. The output of the multiplier 89 is at an exact multiple of this frequency. For example, if the multiplier 89, which includes a pulse former in its output circuit, accomplishes a multiplication of 3600, the pulses from the multiplier will divide each cycle of the output of the pulse formers 48 into 3600 equal increments.

Referring once again to FIG. 2, the output of the flip-flop 74 is also fed to a second counter 90, which counts each shift of the flip-flop from its reset to its set condition. The output from the counter 90 is used to shift the counter 84, and also to reset a flip-flop 91. This disables gates 70 and 76, which are enabled by the signal resulting from the set condition of flip-flop 91.

Initially, an alarm pulse appearing on a line 92 resets counter 84 and sets flip-flop 91 to enable gates 70 and 76. This permits the next pulse from pulse former 48A to set flip-flop 74 and the counter-register 84 thus begins to count the clock pulses passing through gate 82 from the line 83. The next succeeding output pulse from pulse former 48C resets flip-flop 74, thereby inhibiting the further passage of clock pulses to counter 84. The count accumulated in counter 84 while gate 82 was enabled is a direct indication of the phase difference between the signals in the two channels which are connected to the pulse formers 48A and 48C. For example, if the frequency of the signals at the inputs to the pulse formers is 1 kc. and the frequency of the clock pulses is 3.6 mc./s., each pulse passed by gate 82 represents 0.1° phase difference. This may be readily achieved by making the multiplication factor of multiplier 89 equal to 3600, as noted above.

The content of the counter 90 is the number of separate phase measurements that have been taken. This counter is preset so that, upon reaching a predetermined count, a corresponding number of shift pulses are fed to the counter-shift register 84. The latter counter, having accumulated clock pulses passed by gate 82 over a number of separate phase measurement periods, i.e., a number of alternate pulse outputs from pulse formers 48A and 48B, is serially shifted by these shift pulses. Specifically, the shift pulses may shift the content of the counter 84 to the right, a corresponding number of places to transfer the accumulated count serially into a digital computer (not shown). The averaging technique resulting from accumulation of a number of separate phase readings provides compensation for the effects of noise. For example, if the binary system is used and the counter 90 is set for a count of eight, it will shift the counter 84 to the right on reaching a count of eight.

Upon reaching its preset count, the counter 90 also interrupts operation of the phase measuring system by resetting the flip-flop 91.

To prevent ambiguities in the system, the antennas in each pair thereof should be less than one-half wavelength apart. With a frequency multiplication of 6, they are less than 1/6 wavelength apart, as noted above. Thus, in the illustrated system, the phase difference between the outputs of the two antennas is always less than 60°. In the above description of FIG. 2, it was assumed that the signals from the antennas 10A and 10B lead the signal from the antenna 10C. This is the case for values of $\alpha$ from 0° to 90°.

On the other hand, if the incoming wavefront comes from a direction causing it to reach the antenna 10C before the antenna 10A or the antenna 10B, the azimuth angle $\alpha$ will lie in another quadrant. The various relationships are as follows:

TABLE I

| | | |
|---|---|---|
| 0°– 90° | $\phi_A$ leads $\phi_C$ | $\phi_B$ leads $\phi_C$ |
| 90°–180° | $\phi_C$ leads $\phi_A$ | $\phi_B$ leads $\phi_C$ |
| 180°–270° | $\phi_C$ leads $\phi_A$ | $\phi_C$ leads $\phi_B$ |
| 270°–360° | $\phi_A$ leads $\phi_C$ | $\phi_C$ leads $\phi_B$ |

These relationships may be used to resolve the ambiguity, inherent in the tangent function of Equation 1, between angles in the various quadrants.

More specifically, if $\phi_A$ leads $\phi_C$, the indicated phase angle of a system directly measuring the quantity $$(\phi_A - \phi_C)$$

will be less than 180°, with antenna spacing of less than one-half wavelength. On the other hand, if $\phi_C$ leads $\phi_A$, the same measuring system will indicate a value of more than 180° for $(\phi_A - \phi_C)$. Accordingly, a determination of whether $\phi_A$ leads or lags $\phi_C$ can be made by connecting the amplifiers 34A and 34C directly to the phase counter circuit 50, bypassing the multipliers 36A and 36C. Switches 49A and 49C may be actuated to make this connection and the phase counter circuit will then make the required determination.

If it is determined that $\phi_C$ leads $\phi_A$, i.e., if the phase counter circuit indicates a value of more than 180° during the test, the position of the switch 51 is reversed. This reverses the connections of channels A and C at the input of the counter circuit 50. The circuit 50 now operates in the same manner as before, except that it measures the phase angle by which $\phi_C$ leads $\phi_A$.

The switch 49B is actuated along with the switches 49A and 49C. Thus, the counter circuit 52 indicates whether $\phi_B$ leads or lags $\phi_C$. If a lag is indicated, the position of the switch 53 is reversed. More generally, whenever a test of this nature is made, the switches 51 and 53 are set to the positions providing readings of less than 180°. The switches 49 are then reset to connect the frequency multipliers 48 to the phase counter circuits 51 and 53, and the latter then make the required phase determinations with the accuracy afforded by the multiplication of phase differences.

The computer (not shown) processing the outputs of the circuits 50 and 52 computes the elevation and azimuth angles, as first quadrant angles, and these values are then converted to second, third or fourth quadrant angles, if necessary, by means of Table I. It will be noted that the positions of the switches 51 and 53 after the lead-lag tests have been made are indicative of the information provided by Table I. This can be observed visually if mechanical switches are used. If electronic control of the switching function is utilized, electrical outputs indicative of the switch positions can be readily obtained, e.g., at terminals 100 and 101. The computer can then decode this information in a conventional manner and make the required conversions of the computed angle to a second, third or fourth quadrant value, as the case may be.

It will be apparent that the lead-lag test and the setting of the switches 51 and 53 may be automatically controlled by the phase angle computer or by a small auxiliary computing circuit. The system may then alternate between a test mode and an angle-measuring mode.

Preferably, calibration is obtained by switching any antenna 10 such as 10A simultaneously into channels A, B and C and measuring the phase differences between the channels. These phase differences may then be algebraically combined with the phase measurements to obtain corrected measurements. Alternatively, variable phase shifters may be used to reduce the phase differences to zero. When antenna 10A is switched into channels B or C, antennas 10B and 10C are removed from their respective channels but remain terminated.

It will be appreciated that by using a digital technique as contrasted to an analog technique, in determining the phase differential between channels, greatly increased speed of operation may be achieved. For example, an eight-measurement average may be achieved in 8 milliseconds.

Because of the novel heterodyning technique employed in the present invention, the signals in the various channels are reduced to a constant frequency, i.e., the frequency of the reference oscillator 30, which is independent of the ability of tunable local oscillator 14 to follow rapid changes of carrier frequency. Broadband operation of the system is thus achieved by operation of tunable oscillator 14 and yet the signals in the various channels are heterodyned to frequencies within a narrow range to ease the design requirements of the IF amplifiers. The system is thus capable of handling AM, FM or phase modulated signals.

Although the invention, in its disclosed embodiment, employs only three antennas, it will be understood that two separate antenna pairs may also be used. However, the use of three antennas in the manner described above substantially simplifies the system. Moreover, with the addition of a single antenna and a signal channel connected thereto, the system can be made to provide elevation information without knowledge of the wavelength. For example, with an antenna physically disposed above or below the antenna 10C, the added antenna and the antennas 10A and 10C form a system similar to that described above, with the elevation relationships substituted for the azimuth relationships and vice versa. A single additional phase counter circuit would be required.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A system for measuring the relative phase between a first and a second signal, said system comprising:
   (a) first and second signal channels receiving said first and second signals, respectively,
   (b) a reference oscillator for developing an output signal having a constant frequency,
   (c) cross-heterodyning means for introducing said reference oscillator signal into said first and second channels in such manner that said first and second signals are transformed to third and fourth signals having the frequency of said reference oscillator signals and a phase difference corresponding to said phase difference of the first and second signals,
   (d) means for expanding said third and fourth signals in both frequency and phase of a common factor, (e) mixer means for reducing the expanded frequency of said third and fourth signals to a phase measuring frequency, and
(f) means responsive to the output of said mixer means for measuring the expanded phase angle difference between said third and fourth signals in said output.

2. The system claimed in claim 1 wherein said cross-heterodyning means includes:
(a) a first mixer for beating said first signal with the output of said reference oscillator to derive a beat signal,
(b) a second mixer for beating said beat signal with said first signal to provide said third signal, and
(c) a third mixer for beating said beat signal with said second signal to provide said fourth signal.

3. The system claimed in claim 1 wherein said measuring means includes:
(a) means generating a series of clock pulses,
(b) a counter connected to count said pulses,
(c) gating means for passing said clock pulses to said counter,
(d) said gating means being enabled by said third signal at a given point on the waveform thereof and disabled by said fourth signal at a given point on the waveform thereof, whereby the number of clock pulses accumulated in said counter is proportional to the phase angle between said third and fourth signals.

4. The system defined in claim 2 including means for maintaining the phase difference between said first and second signals less than 180°.

5. The system defined in claim 1 including means for maintaining the phase difference between said first and second signals less than 360° divided by said common factor.

6. A system for providing an indication of the angle of incidence of electromagnetic energy on an antenna array, said system comprising:
(a) first, second and third antennas forming said antenna array, the positions of said antennas defining a triangle,
(b) means forming first, second and third signal channels, respectively, connected to said antennas,
(c) a frequency reference source,
(d) means for mixing the output signal of said reference source with the signal in one of said channels to derive a first beat signal,
(e) means for mixing said first beat signal with the signal in said first, second and third channels to form second, third and fourth beat signals,
(f) means in said channels for multiplying said second, third and fourth beat signals in both frequency and phase to form frequency multiplied signals,
(g) means for heterodyning the frequency multiplied signals to the same relatively low frequency, and
(h) phase measuring circuitry for measuring
(1) a first phase difference between the low frequency signals derived from a first pair of said beat signals, and
(2) a second phase difference between the low frequency signals derived from a second pair of said beat signals.

7. The system claimed in claim 6 wherein said phase measuring circuitry includes:
(a) a first phase counter and a second phase counter,
(b) said first phase counter being connected to measure said first phase difference,
(c) said second phase counter being connected to measure said second phase difference,
(d) each of said phase counters including:
(1) gating means enabled by the occurrence of a given point in the waveform of one of the signals whose relative phase is measured by the phase counter and disabled by a given point in the waveform of the other of the signals whose relative phase is measured by the phase counter,
(2) a clock pulse source emitting clock pulses connected to said gating means, and
(3) a first digital counter connected to count clock pulses passed by said gating means.

8. The system claimed in claim 7 wherein each of said phase counters further includes a second digital counter connected to count the number of times said gating means is enabled, said second counter being preset so that upon accumulation of a predetermined count therein, it provides a signal inhibiting further counting of said clock pulses.

9. The system defined in claim 6 in which the spacings between said first and second antennas and between second and third antennas are less than one-half wavelength at the frequency of the signals from said antennas processed in said channels.

10. The system defined in claim 9 in which:
(a) said spacings are less than the wavelength of the signals from said antennas processed in said channels divided by the multiplication factor of said multiplying means,
(b) said first pair of beat signals are derived from said first and second antennas, and
(c) said second pair of beat signals are derived from said second and third antennas.

11. A system for providing an indication of the angle of incidence of electromagnetic energy or an antenna array, said system comprising:
(a) first, second and third antennas forming said antenna array, the positions of said antennas defining a triangle,
(b) the spacings between said first and second antennas and between said second third antennas being less than one-half wavelength at the frequency of operation of said system,
(c) means forming first, second and third signal channels, respectively, connected to said antennas,
(d) a reference oscillator,
(e) means for mixing the output signal of said reference oscillator with the signal in one of said channels to derive a first beat signal,
(f) means for mixing said first beat signal with the signals in said first, second and third channels to form second, third and fourth beat signals,
(g) means in said channels for multiplying said second, third and fourth beat signals in both frequency and phase to form frequency multiplied signals,
(h) means for heterodyning the frequency multiplied signals to the same relatively low frequency independent of the frequency of said electromagnetic energy,
(i) first and second phase measuring circuits, each of said phase measuring circuits measuring the time from the occurrence of a given point on the waveform of a first input signal thereof to the currents of the corresponding point on the waveform of a second input signal thereof,
(j) a first reversing switch connected to provide signals from said first and second channels to said first phase measuring circuit as the first and second inputs thereof, respectively, and alternatively as the second and first inputs thereof,
(k) a second reversing switch connected to apply signals from said second and third channels to said second phase measuring circuit as the first and second inputs thereof, respectively, and alternatively as the second and first inputs thereof,
(l) switching means connected to alternatively provide as the inputs to said phase measuring circuits,
(1) the low frequency signals derived from said frequency multiplied signals,
(2) signals in said channels having a higher frequency than said low frequency and no greater than a value providing a maximum phase difference of 180° between the signals applied to said phase measuring circuits.

12. The combination defined in claim 11 in which said second, third and fourth beat signals are at the frequency of said reference oscillator.

References Cited
UNITED STATES PATENTS

| | | | |
|---|---|---|---|
| 2,437,695 | 3/1948 | Jansky | 343—113 |
| 2,548,671 | 4/1951 | Kreer | 343—113 X |
| 3,217,326 | 11/1965 | Kaufman et al. | 343—113 |

OTHER REFERENCES

Stevens: "Precision Phasemeter for CW or Pulsed UHF," Electronics, Mar. 4, 1960, pp. 54–57.

RODNEY D. BENNETT, *Primary Examiner.*

CHESTER L. JUSTUS, *Examiner.*

R. E. BERGER, *Assistant Examiner.*